(12) United States Patent
Watanabe et al.

(10) Patent No.: US 9,195,554 B2
(45) Date of Patent: Nov. 24, 2015

(54) INFORMATION PROCESSING APPARATUS AND MAINTENANCE METHOD OF AN INFORMATION PROCESSING APPARATUS

(71) Applicant: FUJITSU LIMITED, Kawasaki-shi (JP)

(72) Inventors: Takeshi Watanabe, Kawasaki (JP); Hidejirou Daikokuya, Kawasaki (JP); Kazuhiko Ikeuchi, Kawasaki (JP); Chikashi Maeda, Kawasaki (JP); Norihide Kubota, Kawasaki (JP); Atsushi Igashira, Yokohama (JP); Kenji Kobayashi, Kawasaki (JP); Ryota Tsukahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 13/771,288

(22) Filed: Feb. 20, 2013

(65) Prior Publication Data
US 2013/0246862 A1    Sep. 19, 2013

(30) Foreign Application Priority Data

Mar. 19, 2012   (JP) ................. 2012-062090

(51) Int. Cl.
*G06F 11/00* (2006.01)
*G06F 11/22* (2006.01)
*G06F 11/07* (2006.01)

(52) U.S. Cl.
CPC ............ *G06F 11/22* (2013.01); *G06F 11/0724* (2013.01); *G06F 11/0751* (2013.01)

(58) Field of Classification Search
USPC .......................................................... 714/10
See application file for complete search history.

(56) References Cited

U.S. PATENT DOCUMENTS

| | | | | |
|---|---|---|---|---|
| 5,121,486 A * | 6/1992 | Kurihara et al. | ............... | 709/220 |
| 5,499,342 A * | 3/1996 | Kurihara et al. | ............... | 709/227 |
| 5,721,817 A * | 2/1998 | Kurihara et al. | ............... | 709/227 |
| 6,684,295 B2 * | 1/2004 | Fujimoto et al. | ............... | 711/113 |
| 7,146,540 B2 | 12/2006 | Kakihara | | |
| 7,457,991 B1 * | 11/2008 | Teague et al. | ................. | 714/47.1 |
| 2004/0054866 A1 * | 3/2004 | Blumenau et al. | ............. | 711/202 |
| 2004/0236987 A1 * | 11/2004 | Greenspan et al. | ............. | 714/13 |
| 2005/0240802 A1 * | 10/2005 | Kakihara | ........................... | 714/5 |
| 2006/0224850 A1 | 10/2006 | Yamamoto et al. | | |
| 2009/0217061 A1 | 8/2009 | Yamamoto et al. | | |

(Continued)

FOREIGN PATENT DOCUMENTS

JP    06-44095        2/1994
JP    2005-100467 A   4/2005

(Continued)

OTHER PUBLICATIONS

Japanese Office Action mailed Sep. 29, 2015 for corresponding Japanese Patent Application No. 2012-062090, with Partial English Translation, 8 pages.

*Primary Examiner* — Kamini Patel
(74) *Attorney, Agent, or Firm* — Fujitsu Patent Center

(57) ABSTRACT

An information processing apparatus includes: processing units to perform information processing, the processing units being capable of continuing the information processing even if a processing unit in the processing units stops its operation; and a control unit to perform a potential failure detection process of restarting the processing units one by one and outputting information requesting replacement or repair of a processing unit that is not restarted up.

5 Claims, 8 Drawing Sheets

(56) References Cited

U.S. PATENT DOCUMENTS

2011/0126111 A1* 5/2011 Gill et al. .................. 715/736
2011/0138224 A1* 6/2011 Lee et al. .................... 714/15

FOREIGN PATENT DOCUMENTS

| JP | 2005-301565 | 10/2005 |
| JP | 2006-285464 A | 10/2006 |

* cited by examiner

FIG. 6

| DEVICE | STATUS VALUE |
|---|---|
| CM#0 | OFF/ON COMPLETED |
| CM#1 | BEFORE OFF/ON |
| ⋮ | ⋮ |
| DISK#0 | BEFORE OFF/ON |
| DISK#1 | BEFORE OFF/ON |
| ⋮ | ⋮ |

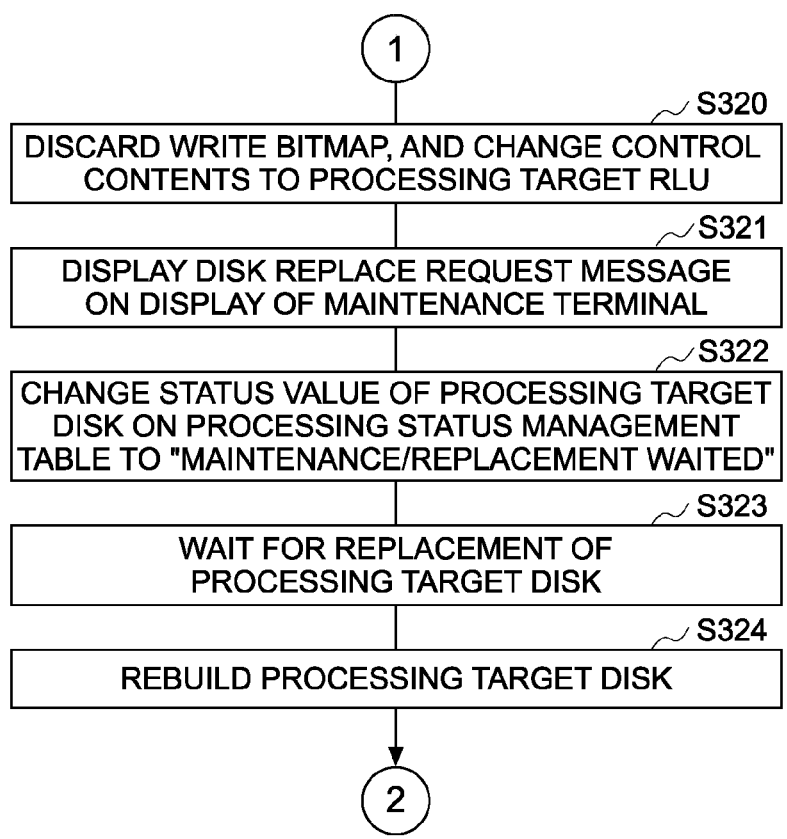

INFORMATION PROCESSING APPARATUS AND MAINTENANCE METHOD OF AN INFORMATION PROCESSING APPARATUS

CROSS-REFERENCE TO RELATED APPLICATIONS

This application is based upon and claims the benefit of priority of the prior Japanese Patent Application No. 2012-062090, filed on Mar. 19, 2012, the entire contents of which are incorporated herein by reference.

FIELD

The present invention relates to an information processing apparatus and a maintenance method of an information processing apparatus.

BACKGROUND

In the information processing apparatuses, there exists an apparatus (for example, refer to patent document 1) having a configuration (denoted hereinafter as a redundant configuration) in which, when a component fails, another component takes over the processing that has been performed by the failed component.

PRIOR ART DOCUMENTS

Patent Document 1: Japanese Patent Laid-Open No. 2005-301565
Patent Document 2: Japanese Patent Laid-Open No. 06-044095

The information processing apparatus having the redundant configuration is usually configured so that a failed component can be replaced without shutting down the apparatus. However, there are cases where the information processing apparatus must be shut down due to, for example, a legal inspection of the building that is equipped with the information processing apparatus.

When shutting down the information processing apparatus intentionally due to the legal inspection etc., it is common to decide a restart time (date and time) of the information processing apparatus from the scheduled time of completion of the legal inspection etc. on the assumption that the information processing apparatus will be restarted without problems, and to report the decided time to users of the information processing apparatus. However, when the information processing apparatus, components of which are outworn/deteriorated, is restarted, there are cases where several components cannot withstand the burden of the restart (load applied when power is switched OFF and then ON again), resulting in that they are not started up. If the number of the not-started components is larger than the number of failed components tolerated by the redundant configuration, some components must be replaced. Hence it follows that the information processing apparatus cannot be restarted as scheduled.

SUMMARY

According to an aspect of the embodiments, an information processing apparatus includes: processing units to perform information processing, the processing units being capable of continuing the information processing even if a processing unit in the processing units stops its operation; and a control unit to perform a potential failure detection process of restarting the processing units one by one and outputting information requesting replacement or repair of a processing unit that is not restarted up.

According to another aspect of the embodiments, an information processing apparatus includes: processing units to perform information processing, the processing units being capable of continuing the information processing even if a processing unit in the processing units stops its operation, wherein the processing units includes a master processing unit capable of performing a potential failure detection process of restarting the processing units one by one and outputting information requesting replacement or repair of a processing unit that is not restarted up.

According to still another aspect of the embodiments, a maintenance method of an information processing apparatus including processing units to perform information processing, the processing units being capable of continuing the information processing even if a processing unit in the processing units stops its operation, the maintenance method includes restarting, by a computer, the processing units one by one; and outputting, by the computer, with respect to each processing unit that is not restarted up, information requesting replacement or repair of the processing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF EXPLANATION OF THE DRAWINGS

FIG. 6 is an explanatory diagram of a processing status management table provided in the master CM.

FIG. 8 is a second part of the flowchart of the master-type disk diagnosis process performed by the master CM.

DESCRIPTION OF EMBODIMENTS

In-depth descriptions of an embodiment of the present invention will hereinafter be made with reference to the drawings. Note that configuration of the embodiment, which will hereinafter be described, is nothing more than exemplification of the present invention, and the present invention is not limited to the configuration of the embodiment.

Figure 1:
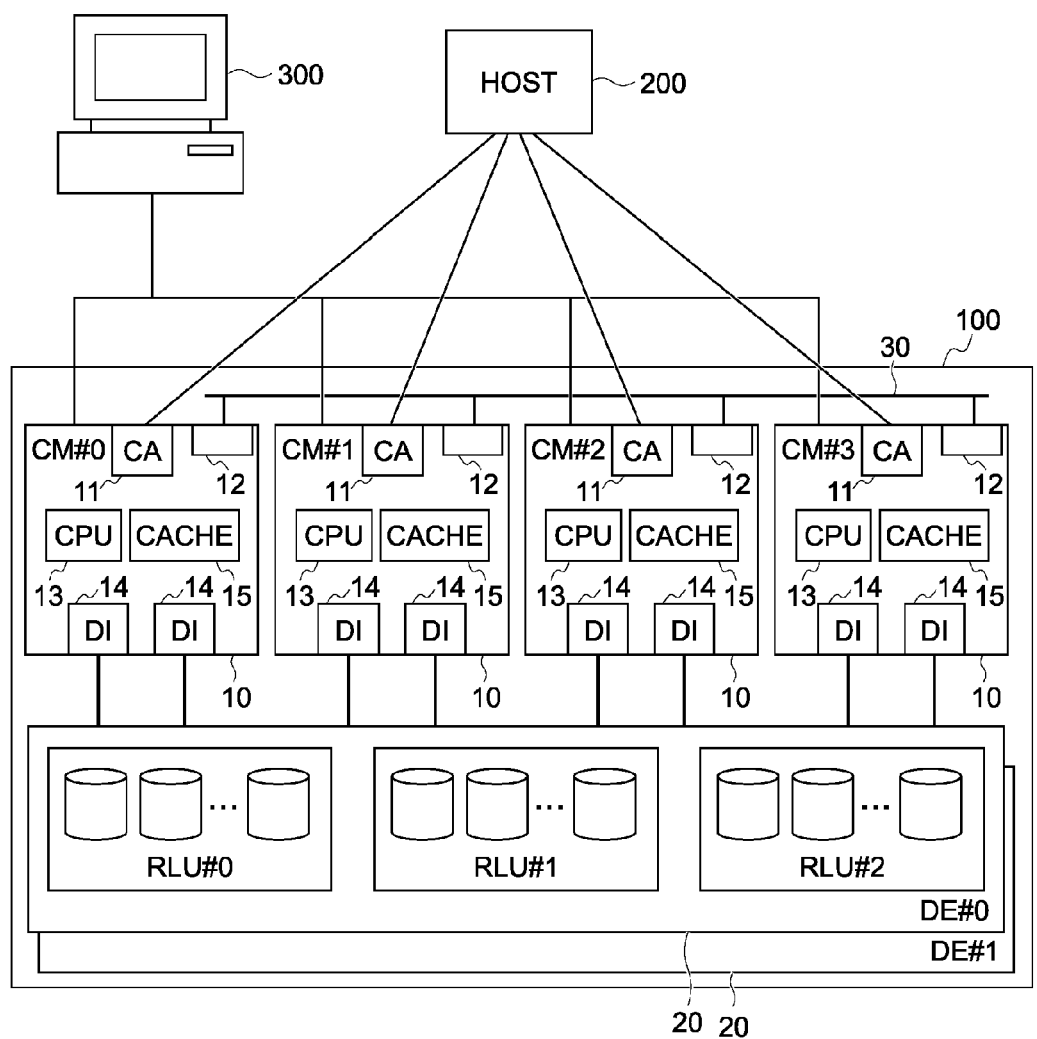
FIG. 1 is an explanatory diagram of configuration and usage mode of an information processing apparatus according to an embodiment.

First of all, configuration and operation of an information processing apparatus 100 according to an embodiment of the present invention will be outlined referring to FIG. 1.

As depicted in FIG. 1, the information processing apparatus 100 is an apparatus (a storage system) that is to be connected with more than one host 200 and a maintenance terminal 300, and includes an even number of CMs (Controller Modules) 10 and some DEs (Drive Enclosures) 20.

Each of the DEs 20 in the information processing apparatus is a unit configured to mount, into a body unit capable being mounted with up to a specified number of drives (hard disk drives), a plurality (equal to or less than the specified number) of drives.

Each of the CMs 10 is a unit that makes a plurality of disks within the information processing apparatus 100 (within all DEs 20) function as a plurality of RLUs. Note that the RLU (RAID (Redundant Array of Independent Disks) logical unit) means the unit that is called RAID group, disk array device, and so on. Each RLU in the present embodiment has redundancy.

Each CM 10 is a kind of a computer, and includes a CPU (Central Processing Unit) 13 and a cache memory 15. Further, each CM 10 also includes a CA (Channel Adapter) 11 that is an interface circuit for the host 300, a communication interface 12 to perform communications with other CMs 10 via a bus 30, and two DIs (Device Interfaces) 14 that are interface circuits for the DEs 20.

Moreover, each CM 10 includes the following components (unillustrated):

A flash ROM (Read Only Memory) stored with BIOS (Basic Input Output System) etc.;

A DRAM (Dynamic Random Access Memory) used as a storage area of programs read from a system disk (a specific RLU) and a work area for the programs;

A battery backed CMOS (Complementary Metal-Oxide Semiconductor) memory to store various items of information (setting values etc.); and A LAN port to be connected to the LAN (Local Area Network) including the maintenance terminal 300.

To each CM 10, some RLUs that the CM 10 should control are allocated in advance. Further, each CM 10 receives a read/write request for each of the RLUs that the CM 10 should control (the RLUs will be hereinafter termed the control object RLUs), and responds to the received request by controlling one or more disks in the control object RLU.

Moreover, the CMs 10 in the information processing apparatus 100 are paired every two modules, and each CM 10, when a mirror CM, which is a CM 10 with which the self-CM 10 is paired, fails, takes over the processing that has been performed by the mirror CM. Furthermore, one CM 10 in the information processing apparatus 100 operates as a master CM, and each of the other CMs 10 operates as a slave CM.

Given next are explanations of the operation of the information processing apparatus 100 (functions of each CM 10 in the information processing apparatus 100).

The master CM in the information processing apparatus 100 has a function of performing information exchange with a user (acquisition of instructions from a user, presentation of information to a user), who is a manager of the information processing apparatus 100, etc., by utilizing the maintenance terminal 300 as an input-output device.

This function has capability of obtaining a start instruction of a scheduled shutdown preparation process. Here, the start instruction of the scheduled shutdown preparation process is an instruction including a designation of the time (date and time; hereinafter referred to as the scheduled shutdown time) at which the information processing apparatus 100 will be shut down. The user issues the start instruction of the scheduled shutdown preparation process by operating the maintenance terminal 300, for example, when the information processing apparatus 100 must be shut down for the legal inspection of the building in which the information processing apparatus 100 is installed.

Figure 2:
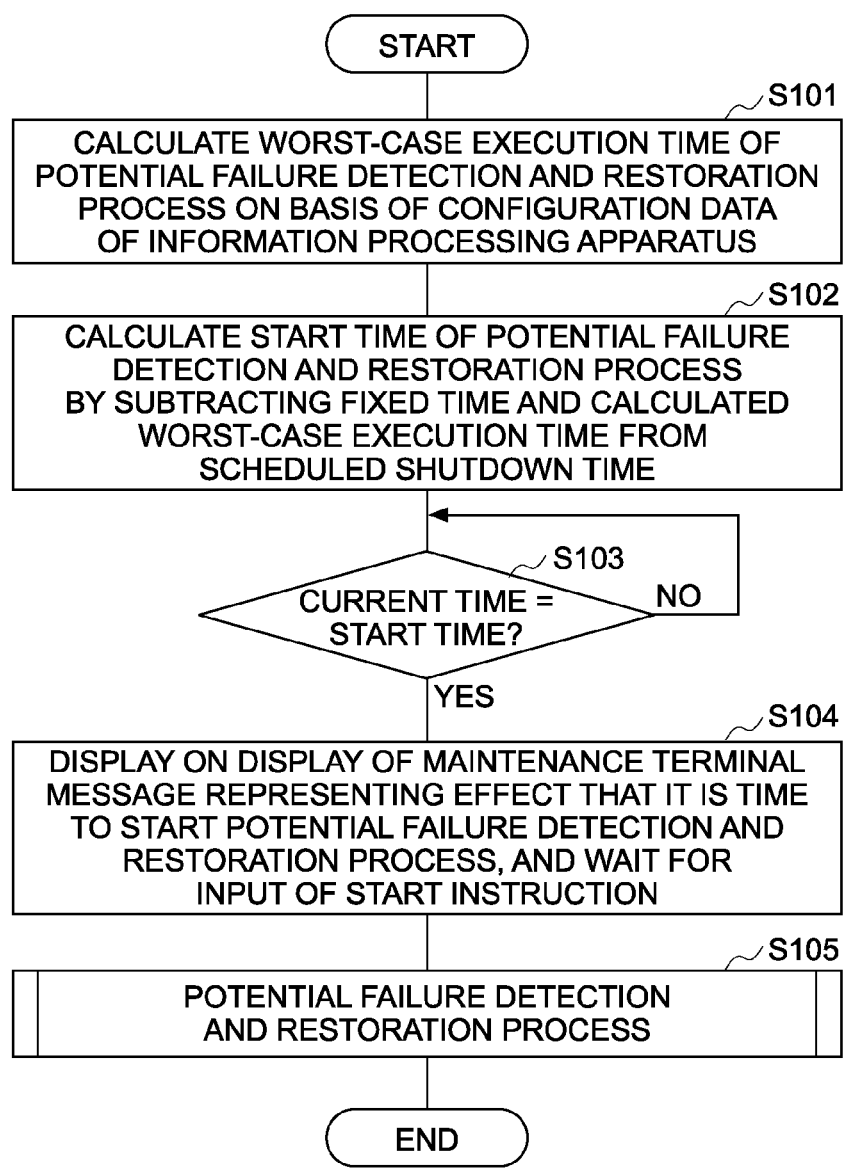
FIG. 2 is a flowchart of a scheduled shutdown preparation process performed by a master CM in the information processing apparatus according to the embodiment.

The master CM having detected (recognized) that the user issued the start instruction of the scheduled shutdown preparation process, starts the scheduled shutdown preparation process in steps shown in FIG. 2.

In advance of a detailed discussion on processes of steps S101-S104 in the scheduled shutdown preparation process, for convenience of explanation, details of the potential failure detection and restoration process that the master CM performs at step S105 will be described.

Figure 3:
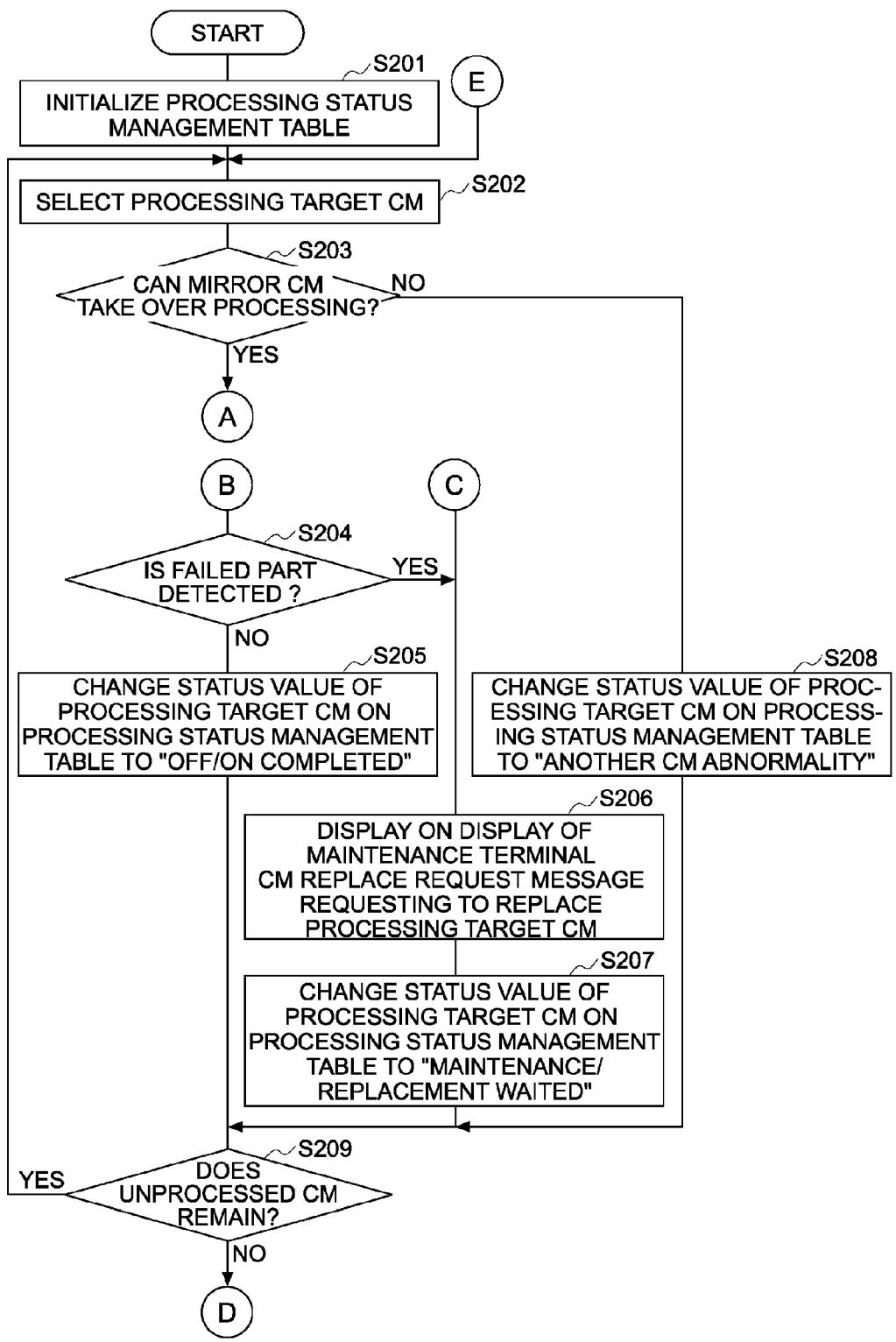
FIG. 3 is a first part of a flowchart of a potential failure detection and restoration process performed in the scheduled shutdown preparation process.
Figure 4:
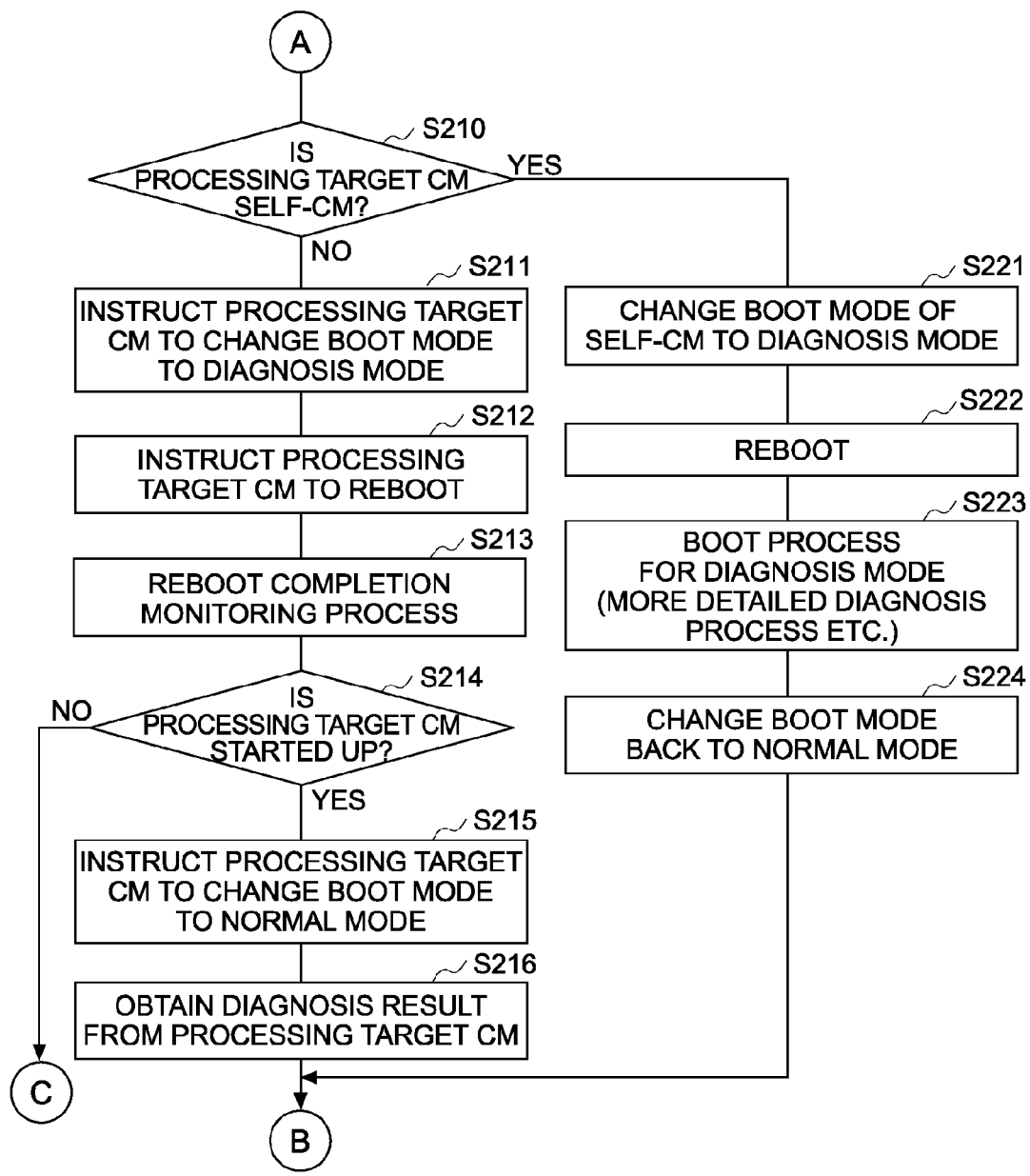
FIG. 4 is a second part of the flowchart of the potential failure detection and restoration process performed in the scheduled shutdown preparation process.
Figure 5:
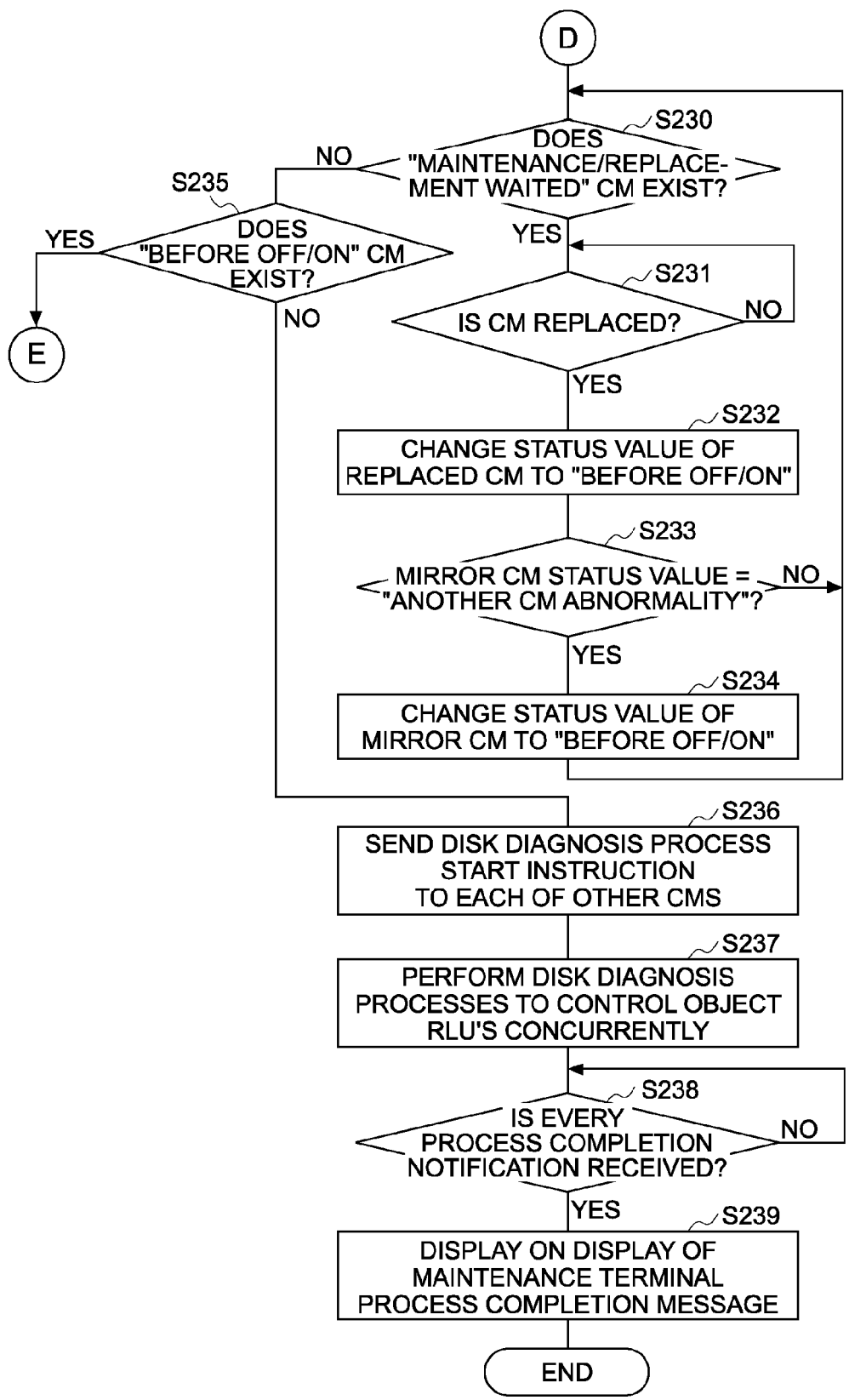
FIG. 5 is a third part of the flowchart of the potential failure detection and restoration process performed in the scheduled shutdown preparation process.

FIGS. 3-5 illustrate a flowchart of the potential failure detection and restoration process.

As illustrated in FIG. 3, the master CM having started the potential failure detection and restoration process, at first, initializes a processing status management table (step S201).

The processing status management table is a table that exists on the CMOS memory of the master CM, and has a configuration as illustrated in FIG. 6. That is, the processing status management table is a table on the battery backed CMOS memory, which is capable of storing a status value with respect to each of the devices (CMs 10 and disks) in the information processing apparatus 100.

Each status value stored in the processing status management table is information indicating progress status and result of processing to each device. The available status values are listed below.

<<Status Values Used for Either of CM 10 and Disk>>

"BEFORE OFF/ON" indicating that any process is not yet performed to the associated device;

"MAINTENANCE/REPLACEMENT WAITED" indicating that the associated device needs replacing (or repairing); and "OFF/ON COMPLETED" indicating that the potential failure detection and restoration process to the associated device is completed (it is ascertained that turning the power off and on again does not cause problems on the associated device, the associated device is replaced to a device that does not get out of order when the power is turned off and on again).

<<Status Value Only Used for CM 10>>

"ANOTHER CM ABNORMALITY" indicating that processing (restart etc.) to the associated device is not performed because its mirror CM is abnormal.

At the above-mentioned step S201, this processing status management table is initialized into the table which is capable of storing status values about all the devices in the information processing apparatus 100 and in which "BEFORE OFF/ON" is set as the status value of each device.

After finishing the processing of step S201 (FIG. 3), the master CM select, from the CMs 10 whose status values on the processing status management table are "BEFORE OFF/ON," a processing target CM that is a CM 10 to which processing subsequent to step S203 is performed (step S202). Hereinafter, the CM 10 whose status value on the processing status management table is X (X="BEFORE OFF/ON," "OFF/ON COMPLETED," etc.) will be termed the X CM. Moreover, the "BEFORE OFF/ON" CM will be also termed the unprocessed CM.

The master CM having selected the processing target CM judges whether the mirror CM of the processing target CM is in situation where it can take over the processing of the processing target CM on the basis of the status value on the processing status management table (step S203). Specifically, when performing step S203, the master CM reads out the status value of the mirror CM of the processing target CM from the processing status management table (FIG. 6). Then, if the read status value is "BEFORE OFF/ON" or "OFF/ON COMPLETED," the master CM judged that the mirror CM of the processing target CM is in situation where it can take over the processing of the processing target CM. Whereas if the read status value is not either of "BEFORE OFF/ON" and "OFF/ON COMPLETED," the master CM judges that the mirror CM of the processing target CM is not in situation where it can take over the processing of the processing target CM.

When the mirror CM can take over the processing of the processing target CM (step S203; YES), the master CM starts processing subsequent to step S210 in FIG. 4. In other words, in cases where, since the mirror CM can take over the processing of the processing target CM, it is possible to maintain a condition capable of responding the read/write request to any RLU even if operation of the processing target CM is stopped, the master CM starts the processing subsequent to step S210 in FIG. 4.

At step S210, the master CM judges whether the processing target CM is the self-CM or not.

When the processing target CM is not the self-CM (step S210; NO), the master CM, through communications via the bus 30, instructs the processing target CM (another CM) to change its boot mode into a diagnosis mode and to reboot (steps S211 and S212). Here, the diagnosis mode is a boot mode that causes the CM 10 to performs a more detailed diagnosis process than a diagnosis process that the CM 10 performs when in the normal boot mode (which will hereinafter be referred to as the normal mode).

When the processing of steps S211 and S212 is performed, normally (unless serious failure is elicited due to reboot), the processing target CM performs a comparatively detailed diagnostic process to every part (the CA 11, the communication interface 12, the CPU 13, the DI 14, the cache memory 15, the CMOS memory, etc.), and enters the operable state. Then, the processing target CM sends the master CM a reboot completion notification indicating that restart is completed.

On the other hand, the master CM having finished the processing of step S212 starts a reboot completion monitoring process (step S213), and comes to a status of monitoring that the reboot completion notification is transmitted from the processing target CM 10 and that a waiting time elapses. Note that the phrase "a waiting time passes" connotes "elapsed time from the restart instruction becomes longer than the waiting time." Further, the waiting time is a time predefined as the longest time required to reboot a CM 10. In other words, the waiting time is a time during which the master CM waits for the reboot completion notification from the processing target CM 10, and judges that the processing target CM 10 is failed when the time passes without receiving the reboot completion notification.

When receiving the reboot completion notification from the processing target CM before the waiting time elapses, the master CM judges that the processing target CM is started up, and terminates the reboot completion monitoring process. Further, when the waiting time passes without receiving the reboot completion notification, the master CM judges that the processing target CM is not started up, and terminates the reboot completion monitoring process.

The master CM having finished the reboot completion monitoring process, when the processing target CM is started up (step S214; YES), instructs the processing target CM to change the boot mode to the normal mode (step S215). Subsequently, the master CM obtains the result (diagnosis result in FIG. 4) of the diagnosis process from the processing target CM (step S216). Thereafter, the master CM starts processing subsequent to step S204 (which will be described in detail later on) in FIG. 3.

On the other hand, when the processing target CM is not started up (step S214; NO), the master CM starts processing subsequent to step S206 (which will be described in detail later on) in FIG. 3.

When the processing target CM is not another CM but the self-CM (step S210; YES), the master CM changes its own boot mode into the diagnosis mode, and then reboots itself (steps S221 and S222).

The master CM having finished the processing of step S222 turns off itself and performs the boot process for the diagnosis mode (step S223), i.e., the boot process including the more detailed diagnostic process than the normal diagnostic process, and then enters the operable state. Thereafter, the master CM performs processing of changing its boot mode back into the normal mode (step S224), and then starts processing from step S204 onward in FIG. 3

Note that, although not described in detail, when in this potential failure detection and restoration process, the master CM informs its mirror CM of the progress status of the processing as required. Further, the mirror CM of the master CM grasps the progress status of the potential failure detection and restoration process, and starts to monitor reboot situation of the master CM when the processing of step S222 is performed by the master CM. If the master CM is not started up, the mirror CM starts functioning as the master CM, and takes over the potential failure detection and restoration process that the not-started master CM has performed till then in a way as to perform processing from step S206 onward.

At step S204 (FIG. 3), the master CM judges whether more than one failure part is detected in the diagnostic process by the processing target CM (the self-CM or another CM).

When any failure part is not detected by the diagnostic process (step S204; NO), the master CM changes the status value of the processing target CM on the processing status management table into "OFF/ON COMPLETED" (step S205). Thereafter, the master CM judges whether or not an unprocessed CM (a "BEFORE OFF/ON" CM) remains (step S209), and, when an unprocessed CM remains (step S209; YES), performs the processing from step S202 again.

On the other hand, when a failure part is detected by the diagnostic process (step S204; YES), the master CM displays a CM replace request message requesting the user to replace (repair) the processing target CM on the display of the maintenance terminal 300 (step S206). Further, the master CM, when the processing target CM is not started up (FIG. 4, step S214; NO), performs the processing of this step S206 without performing the processing of step S204.

After finishing the processing of step S206, the master CM changes the status value of the processing target CM on the processing status management table into "MAINTENANCE/REPLACEMENT WAITED" (step S207). Thereafter, the master CM judges whether or not an unprocessed CM exits (step S209), and, if an unprocessed CM remains (step S209; YES), loops back to step S202, and performs the processing to the unprocessed CM.

As apparent from the description given hitherto, when the processing of step S207 to a CM 10 is performed and then the mirror CM of the CM 10 is selected as the processing target CM, the status value of the mirror CM of the processing target CM is changed to "MAINTENANCE/REPLACEMENT WAITED."

When the status value of the mirror CM of the processing target CM is "MAINTENANCE/REPLACEMENT WAITED" (when the mirror CM cannot take over the processing of the processing target CM: step S203; NO), the master CM changes the status value of the processing target CM into "ANOTHER CM ABNORMALITY" (step S208). Then, the master CM performs processing (decision) of step S209.

If the unprocessed CM disappears while such processing is performed repeatedly (step S209), the master CM, as shown in FIG. 5, judges whether or not there exists the "MAINTENANCE/REPLACEMENT WAITED" CM (step S230). Note that, as already defined, the "MAINTENANCE/REPLACEMENT WAITED" CM indicates the CM 10 whose status value on the processing status management table matches "MAINTENANCE/REPLACEMENT WAITED."

When there exists the "MAINTENANCE/REPLACEMENT WAITED" CM (step S230; YES), the master CM waits replacement of one of the "MAINTENANCE/REPLACEMENT WAITED" CMs (or the only one "MAINTENANCE/REPLACEMENT WAITED" CM in existence) (step S231). At this step S231, a process of monitoring (watching) that completion of replacement of a CM 10 is notified from the user through the maintenance terminal 300 or a process of automatically detecting completion of replacement of a CM 10 is performed, for example.

When detecting that a "MAINTENANCE/REPLACEMENT WAITED" CM is replaced (step S231; YES), the master CM, to begin with, changes the status value about the replaced CM on the processing status management table to "BEFORE OFF/ON" (step S232). Subsequently, the master CM judges whether or not the status value of the mirror CM of the replaced CM 10 is "ANOTHER CM ABNORMALITY" (step S233). If the status value is "ANOTHER CM ABNORMALITY" (step S233; YES), the master CM changes the status value to "BEFORE OFF/ON" (step S234), and then starts the processing subsequent to step S230. Further, if the status value of the mirror CM of the replaced CM 10 is not "ANOTHER CM ABNORMALITY" (step S233; NO), the master CM starts the processing subsequent to step S230 without changing the status value (in this case, the value is "OFF/ON COMPLETED").

When the "MAINTENANCE/REPLACEMENT WAITED" CM disappears while having repeated the above processing (step S230; NO), the master CM judges whether or not there exists the "BEFORE OFF/ON" CM (step S235). Moreover, when there is no "MAINTENANCE/REPLACEMENT WAITED" CM from the beginning (step S230; NO), the master CM performs the decision of step S235 without performing the processing of step S221, etc.

Then, the master CM, when there exits no "BEFORE OFF/ON" CM (step S235; NO), starts processing (details will be discussed later on) subsequent to step S236.

Whereas if there exits a "BEFORE OFF/ON" CM (step S235; YES), the master CM checks whether or not each replaced CM 10 is a device that does not get out of order when the power is turned off and on again by performing the processing subsequent to step S202 of FIG. 3. If it is ascertained that every replaced CM 10 is a device that does not get out of order when the power is turned off and on again, the master CM starts processing from step S236.

At step S236, the master CM sends a disk diagnosis process start instruction to each of the other CMs 10 (the slave CMs). The disk diagnosis process start instruction is the instruction that causes the slave CM receiving this to perform slave-type disk diagnosis processes to the control object RLUs concurrently, and to send, when every slave-type disk diagnosis process is completed, disk diagnosis process completion notification denoting that effect to the master CM.

At the subsequent step S237, the master CM performs master-type disk diagnosis processes to the control object RLUs concurrently. Note that, at this step S237, the master CM also perform processing of receiving a request (a request for change of a status value, a request for display of a message on the display of the maintenance terminal 300; described in detail later) from each slave CM executing one or mode the slave-type disk diagnosis processes, and performing a process corresponding to the received request. Moreover, the master CM also performs processing of receiving a disk diagnostic completion notification from each slave CM.

A content of the master-type disk diagnosis process and a content of the slaver-type disk diagnosis process will now be described in that order.

Figure 7:
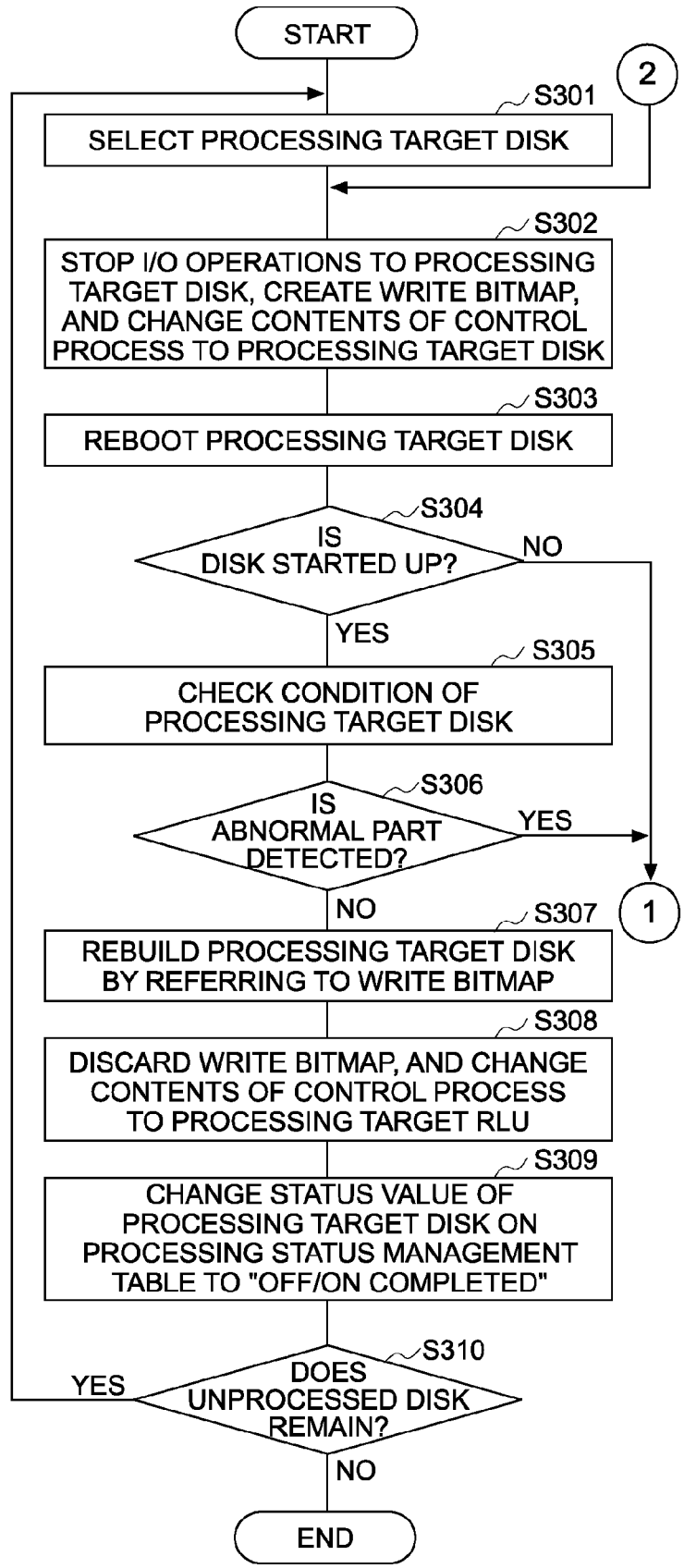
FIG. 7 is a first part of a flowchart of a master-type disk diagnosis process performed by the master CM.

The master-type disk diagnosis process that the master CM performs to each control object RLU at step S237 is a process in steps shown in FIGS. 7 and 8.

Namely, as shown in FIG. 7, the master CM having started the master-type disk diagnosis process to a control object RLU (denoted hereinafter as the processing target RLU), at first, selects a processing target disk from unprocessed disks in the processing target RLU (step S301). Herein, the unprocessed disks in the processing target RLU are defined as disks among the disks used as components of the processing target RLU to which processing subsequent to step S302 is not yet performed.

Next, the master CM stops I/O operations to the processing target disk, and creates (prepares) a Write Bitmap for keeping each storage area in which data is stored while I/O operations are stopped (step S302). Moreover, at this step S302, the master CM shifts to a state of performing processing which is different from the processing performed until then when receiving the read/write request to the processing target RLU. Specifically, the master CM shifts to a status of responding a read/write request to the processing target RLU by using the disks other than the processing target disk, and of, when responding a write request to a storage region, rewriting values of some bits of the Write Bitmap which are associated with the storage region.

The master CM having finished the processing of step S302 reboots the processing target disk (step S303).

Thereafter, the master CM judges whether or not the processing target disk is started up normally (step S304). Specifically, the master CM judges, by obtaining information from the processing target disk, whether the spindle motor of the processing target disk is changed into the status where it operates normally in a predetermined time from the reboot (step S304).

If the processing target disk is started up normally (step S304; YES), the master CM checks the condition of each part (a control system, a head actuator system, etc.) of the processing target disk by, for example, reading data from the processing target disk. (step S305).

When an abnormal part is not detected by the check at step S305 (step S306; NO), the master CM, by referring to the Write Bitmap, rebuilds some parts of the processing target disk (storage areas into which a part of write data, parity, etc. is written if the processing target disk is active) (step S307).

At subsequent step S308, the master CM discards the Write Bitmap, and shifts to the status of performing the normal control to the processing target RLU.

Thereafter, the master CM changes the status value of the processing target disk on the processing status management table into "OFF/ON COMPLETED" (step S309). Then, the master CM judges whether or not an unprocessed disk remains in the disks of the processing target RLUs (step S310), and, when the unprocessed disk remains (step S310; YES), performs the processing subsequent to step S301 again.

On the other hand, when an abnormal part is detected (step S306; YES), the master CM discards the Write Bitmap (FIG. 8, step S320). Moreover, at this step S320, the master CM also performs a process of shifting to the status of responding the read/write request to the processing target RLU by using the disks other than the processing target disk only (the status where the master CM does not update the Write Bitmap even when responding a write request).

Next, the master CM displays the disk replace request message requesting the user to replace (repair) the processing target disk on the display of the maintenance terminal 300 (step S321). Moreover, the master CM changes the status value of the processing target disk on a processing status management table into "MAINTENANCE/REPLACEMENT WAITED" (step S322).

Then, the master CM waits for the user to replace the processing target disk (step S323). At this step S323, a process of monitoring (watching) that the completion of replacement of the processing target disk is notified from the user through the maintenance terminal 300 or a process of automatically detecting the completion of replacement of the processing target disk is performed, for example.

When the processing target disk is replaced, the master CM rebuilds the processing target disk at step S324.

Thereafter, the master CM checks whether or not the processing target disk after the replacement is a module that does not get out of order when rebooted (the power is turned off and on again) by performing the processing subsequent to step S302 (FIG. 7).

The master CM iterates the processing of the above-mentioned content/procedure until the unprocessed disk disappears. Then, the master CM, when the unprocessed disk disappears (step S310; NO), terminates this disk diagnosis process.

Given next are explanations of the content of the slaver-type disk diagnosis process that the slave CM receiving the disk diagnosis process start instruction (see step S236 of FIG. 5) performed with respect to each of the RLUs.

The slaver-type disk diagnosis process performed by the slave CM is a process that differs from the master-type disk diagnosis process (FIGS. 7 and 8) performed by the master CM only in contents of processes at steps 306, s321 and S322.

Specifically at step S309 of the slaver-type disk diagnosis process, performed is not processing of changing the status value of the processing target disk on a processing status management table into "OFF/ON COMPLETED," but processing of requesting the master CM to change the status value of the processing target disk on a processing status management table to "OFF/ON COMPLETED." Further, at step S321 of the slaver-type disk diagnosis process, performed is not processing of displaying the disk replace request message on the display of the maintenance terminal 300, but processing of requesting the master CM to display the disk replace request message on the display of the maintenance terminal 300. Similarly, at step S322 of the slaver-type disk diagnosis process, performed is not processing of changing the status value of the processing target disk on the processing status management table into "MAINTENANCE/REPLACEMENT WAITED," but processing of requesting the master CM to change the status value of the processing target disk on the processing status management table to "MAINTENANCE/REPLACEMENT WAITED."

Referring back to FIG. 5, the discussion of the potential failure detection and restoration process will continuously proceed.

As already explained, the slave CM receiving the disk diagnosis process start instruction, when the slave-type disk diagnosis processes to all control object RLUs are completed, sends the master CM the disk diagnostic completion notification indicating that effect.

The master CM finishing the processing of step S237 (the slave-type disk diagnosis processes to all control object RLUs), judges whether or not the disk diagnostic completion notification from every slave CM is received (step S238).

When there exit some slave CMs from which the disk diagnostic completion notification is not received, the master CM wait for receiving the disk diagnostic completion notification from each slave CM (step S238; NO).

When receiving the disk diagnostic completion notifications from all of the slave CMs (step S238; YES), the master CM displays, on the display of the maintenance terminal 300, a processing completion message of the purport that the potential failure detection and restoration process is completed (step S239). Then, the master CM terminates the potential failure detection and restoration process.

Processing performed before the potential failure detection and restoration process (processing of steps S101-S104 of the scheduled shutdown preparation process) will be discussed referring again to FIG. 2.

As already explained, the master CM starts the scheduled shutdown preparation process (FIG. 2) when the user issues the start instruction of the scheduled shutdown preparation process including a designation of the scheduled shutdown time.

As shown in FIG. 2, the master CM having started the scheduled shutdown preparation process, to begin with, calculates (estimates) the worst-case execution time of the potential failure detection and restoration process on the basis of configuration information of the information processing apparatus 100, etc. (step S101). Herein, the configuration information of the information processing apparatus 100 is defined as information, which is managed by the master CM, including number of the CMs 10 in the information processing apparatus 100 (the number is hereinafter denoted as the CM number), number of disks that constitutes each RLU, capacity of each disk in each RLU, etc.

There are various procedures that can be employed as the calculation procedure of the worst-case execution time of the potential failure detection and restoration process at step S101. For instance, the following procedure can be employed as the calculation procedure of the worst-case execution time of the potential failure detection and restoration process.

To begin with, the master CM calculates a time (denoted hereinafter as a CM check time) it takes until a branch to "NO" occurs at step S235 (FIG. 5) after the potential failure detection and restoration process is started in situation where all CMs 10 need to be replaced on the basis of the CM number in the configuration information and a time required for replacement of one CM 10 which is preset. Next, the master CM calculates, with respect to each of RLUs, a time it takes to complete the disk diagnosis process to the RLU in situation where all disks need to be replaced on the basis of information about each RLU in the configuration information and times, which are preset, required for rebuilding respective disks having different capacities. Then, the master CM calculate the worst-case execution time of the potential failure detection and restoration process by adding the maximum value among the calculated times about the RLUs and the CM check time together.

The master CM finishing the processing of step S101 calculates a start time of the potential failure detection and restoration process, which will be hereinafter denoted as the processing start time, by subtracting the calculated worst-case execution time and a predetermined time (which will be explained in detail later on) from the scheduled shutdown time (step S102).

Next, the master CM waits for the processing start time to come (step S103). When the processing start time has come (step S103; YES), the master CM, at step S104, first display a message representing that the processing start time has come on the display of the maintenance terminal 300. Next, the master CM waits for input of the start instruction of the potential failure detection and restoration process by the user. Then, when detecting that the start instruction of the potential failure detection and restoration process is inputted, the master CM finishes the processing of step S104.

Subtraction of the predetermined time from the scheduled shutdown time is a process that is performed by taking into account the fact that the user may not aware of the message indicating that the processing start time has come immediately after the message is displayed on the display of the maintenance terminal 300 (and there are cases where replacement of the device(s) by the user is required in the potential failure detection and restoration process). Therefore, as the predetermined time, used is "the longest time it takes the user to input the start instruction of the potential failure detection and restoration process after the message indicating that the processing start time has come is displayed on the display of the maintenance terminal 300" which is determined on the basis of the installation environment of the maintenance terminal 300, etc.

The master CM having finished the processing of step S104 performs, at subsequent step S105, the potential failure detection and restoration process whose procedures are already described.

In short, the processing of steps S101-S104 of the scheduled shutdown preparation process is a process that is performed to make the user start the potential failure detection and restoration process at the timing that causes the potential failure detection process to be completed before the scheduled shutdown time even if replacement of many devices is required. Further, the potential failure detection and restoration process is a process of attempting to elicit potential failure of each device by rebooting it while keeping the condition of the information processing apparatus in the condition capable of responding arbitrary read/write requests from the host 200, and of requesting the user to replace (or repair) each device the potential failure of which is elicited.

Accordingly, it can be said that the present information processing apparatus 100 capable of performing the scheduled shutdown preparation process described above is an apparatus that can prevent the restart schedule from being delayed due to the potential failures of some devices that are elicited by restart of the apparatus after scheduled shutdown.

Modified Embodiment

The information processing apparatus 100 according to the above-mentioned embodiment can be modified in a variety of forms. For example, the information processing apparatus 100 can be modified into the apparatus where the CMs 10 are not paired every two module (apparatus where, when a first CM fails, a second CM takes over processing of the first CM, and, when a second CM fails, a third CM takes over processing of the second CM, etc.). Further, the information processing apparatus 100 can also be modified to the apparatus where a special diagnosis is not performed when the CM 10 is rebooted (apparatus each CM of which is not rebooted in the diagnosis mode).

The information processing apparatus 100 can also be modified into the apparatus that cannot perform processes of steps S101-S104 (the apparatus that starts the potential failure detection and restoration process at the timing decided by the user). Furthermore, it is possible to modify the information processing apparatus 100 into the apparatus that periodically checks devices by rebooting devices one by one (for example, the apparatus that checks a check target device while changing the check target device every day). Further, the failed CM 10 or disk is usually replaced with a new CM 10 or disk (that is, a device, potential failure of which is hardly elicited by reboot). Therefore, it is also possible to modify the information processing apparatus 100 into the apparatus that does not checks each replaced CM 10 or disk by rebooting it (the apparatus that, with respect to each replaced CM 10 or disk, only performs the process of changing its status value to "OFF/ON COMPLETED").

It is possible to configure the information processing apparatus 100 and the maintenance terminal 300 so that processing similar to the potential failure detection and restoration process is performed under the control of the maintenance terminal 300 (so that the maintenance terminal 300 instructs each CM 10 in the information processing apparatus 100 to reboot itself or its control target RLU).

Moreover, naturally you may apply to the storage system with which the control system does not serve as a redundant configuration in the above-mentioned technology, and the unit/system which has redundant configurations other than a storage system. Moreover, it is taken for granted that the technology described above can be applied to the storage system including a control system having no redundancy, a device/system, which is not a storage system, having redundancy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A maintenance method of an information processing apparatus including processing units that perform information processing, the processing units being capable of continuing the information processing even when one of the processing units stops its operation, the maintenance method comprising:

performing, by a computer, a potential failure detection process of restarting the processing units one by one and outputting, with respect to each processing unit that is not restarted up, information requesting replacement or repair of the processing unit, wherein the processing units are disk drives that are used as components of a disk array device having redundancy, the potential failure detection process is a process that is suspended until a disk drive that a user is requested to replace or repair is replaced, the maintenance method comprising:

calculating, by the computer, on a basis of a scheduled shutdown time of the information processing apparatus inputted by the user, number of the disk drives and a time required for replacement of one disk drive, a start time of the potential failure detection process allowing the potential failure detection process to be completed before the scheduled shutdown time even when all of the disk drives are replaced;

prompting, by the computer, the user to input of a start instruction of the potential failure detection process before the calculated start time; and starting, by the computer, the potential failure detection process when the start instruction is inputted.

2. An information processing apparatus, comprising:

processing units that perform information processing, the processing units being capable of continuing the information processing even when one of processing units stops its operation; and a control unit that performs a potential failure detection process of restarting the processing units one by one and outputting information requesting replacement or repair of a processing unit that is not restarted up, wherein the processing units are disk drives that are used as components of a disk array device having redundancy, the potential failure detection process is a process that is suspended until a disk drive that a user is requested to replace or repair is replaced, the control unit executes:

calculating, on a basis of a scheduled shutdown time of the information processing apparatus inputted by the user, number of the disk drives and a time required for replacement of one disk drive, a start time of the potential failure detection process allowing the potential failure detection process to be completed before the scheduled shutdown time even when all of the disk drives are replaced;

prompting the user to input of a start instruction of the potential failure detection process before the calculated start time; and starting the potential failure detection process when the start instruction is inputted.

3. The information processing apparatus according to claim 2, wherein the potential failure detection process is a process of outputting the information with respect to a disk drive that is not restarted up and a disk drive that is restarted up but is determined to have a failure.

4. An information processing apparatus, comprising:

processing units to perform information processing, the processing units being capable of continuing the information processing even when one of the processing units stops its operation, wherein the processing units includes a master processing unit capable of performing a potential failure detection process of restarting the processing units one by one and outputting information requesting replacement or repair of a processing unit that is not restarted up, the potential failure detection process is a process that is suspended until a disk drive that a user is requested to replace or repair is replaced, the master processing unit executes:

calculating, on a basis of a scheduled shutdown time of the information processing apparatus inputted by the user, number of the processing units and a time required for replacement of one processing unit, a start time of the potential failure detection process allowing the potential failure detection process to be completed before the scheduled shutdown time even when all of the processing units are replaced;

prompting the user to input of a start instruction of the potential failure detection process before the calculated start time; and starting the potential failure detection process when the start instruction is inputted.

5. The information processing apparatus according to claim 4, wherein the potential failure detection process is a process of outputting the information with respect to a disk drive that is not restarted up and a disk drive that is restarted up but is determined to have a failure.

* * * * *